United States Patent [19]

Koya et al.

[11] Patent Number: 5,060,077
[45] Date of Patent: Oct. 22, 1991

[54] REPRODUCTION APPARATUS HAVING MEANS FOR INITIALIZING FLAG MEMORIES DURING SLOW MOTION AND FREEZE REPRODUCTION

[75] Inventors: Toshiaki Koya, Kadoma; Kunio Suesada, Ikoma, both of Japan

[73] Assignee: Matsushita Electric Industrial Co., Ltd., Osaka, Japan

[21] Appl. No.: 490,599

[22] PCT Filed: Aug. 28, 1989

[86] PCT No.: PCT/JP89/00872
§ 371 Date: Apr. 17, 1990
§ 102(e) Date: Apr. 17, 1990

[87] PCT Pub. No.: WO90/02401
PCT Pub. Date: Mar. 8, 1990

[30] Foreign Application Priority Data
Aug. 31, 1988 [JP] Japan ................. 63-216567

[51] Int. Cl.⁵ .............................. H04N 5/76
[52] U.S. Cl. .................... 358/335; 358/310; 358/312; 360/10.1
[58] Field of Search ............... 358/310, 312, 338, 335, 358/311, 321, 336, 327; 360/10.1, 10.3

[56] References Cited

U.S. PATENT DOCUMENTS
4,612,569  9/1986  Ichinose ......................... 358/311
4,698,664 10/1987  Nichols et al. ................. 358/311

FOREIGN PATENT DOCUMENTS
61-271671 12/1986 Japan.

Primary Examiner—Roy N. Envall, Jr.
Assistant Examiner—Thai Tran
Attorney, Agent, or Firm—Wenderoth, Lind & Ponack

[57] ABSTRACT

A method and apparatus of reproducing data recorded on a recording medium encompass generating a flag indicative of a state of the recorded data, storing the recorded data into a data memory and the flag into a flag memory, reading the recorded data from the data memory and flag from the flag memory, and selectively initializing the flag memory during a reading period, such as slow-motion reproduction and freeze reproduction, in which the recorded data and flag are to be repeatedly read out from the data memory and flag memory a number of times prior to a subsequent writing of the recorded data and flag into the data memory and the flag memory. The initializing of the flag memory is carried out only during a final time the recorded data stored in the data memory is read during the reading period.

8 Claims, 6 Drawing Sheets

REPRODUCTION APPARATUS HAVING MEANS FOR INITIALIZING FLAG MEMORIES DURING SLOW MOTION AND FREEZE REPRODUCTION

FIELD OF TECHNOLOGY

The present invention relates an apparatus, for example, a digital video tape recorder, for reproducing a video signal which has been digitally recorded on a recording medium.

BACKGROUND ART

Of the conventional digital video tape recorders, the most pertinent prior art relevant to the present invention is disclosed in, for example, the Japanese Laid-open Patent Publication No. 61-271671. In the specification of this publication, the control of an error flag during a slow-motion reproduction in the digital video tape recorder or the like is discussed. Hereinafter, this prior art will be described sequentially.

Hitherto, in the digital video tape recorder, a reproducing head traverses some recorded tracks during a high speed reproduction in which the tape transport speed is higher than that during the recording and, therefore, reproduced data consist of fragmentary data over a plurality of fields. A picture reproduced during the high speed reproduction, that is, a high-speed reproduced picture, is obtained by writing those fragmentary data into a buffer memory and then reading them out therefrom. When the reproducing data are so reproduced fragmentarily, data in all of the addresses in a memory will not be altered and the data which have been read out remain stored in the memory without being updated. Accordingly, the previous reproducing data are outputted in the form as they stand and are subsequently mixed with the current reproducing data, resulting in deterioration in the quality of reproduced pictures. In view of this, use has been made of a first flag memory adapted to be supplied with addresses identical with those in the buffer memory so that the flag can be initialized, (i.e., "1" is written) immediately after the data and the flag have been read out. Also, when the data are written in the buffer memory, a decision is made by a first error correcting decoder in the previous stage whether or not the data are correct ones and, since a flag indicative of the correctness or incorrectness of the data is outputted, only the data represented by the flag indicating the correctness are written in the buffer memory and, at the same time, "0" is written in a first flag memory when the flag indicates the correctness. By so doing, the flag read out from the first flag can distinguish whether they are the previous reproducing data or whether they are the current reproducing data. The previous reproducing data recognized by this flag can be revised by a second error correcting decoder in the rear stage of the buffer memory or by a revising circuit disposed in a stage rearwardly thereof.

The operation of the digital video tape recorder of the above described construction which takes place during the slow-motion reproduction will now be described. During the slow-motion reproduction, the tape transport speed is lowered as compared with that during the recording and a track is traversed several times to reproduce the data. However, unlike that during the high speed reproduction, a single track is traced several times while slightly sequentially displaced and, therefore, most of the data recorded on the tracks remain stored in the buffer memory in which only the reproduced, correct data have been written. Since the time during which the data remain stored in the memory corresponds to the reduction in tape transport speed (for example, twice in the case of the speed being ½ of the speed during the recording or three-times in the case of the speed being ⅓ of the speed during the recording), the same image data are read out from the buffer memory repeatedly over some fields during that time. Because of this, although the output from the first flag memory correctly represent either the previous reproducing data or the current reproducing data as far as the first reading is concerned, all of the flags are initialized simultaneously with the first reading and, therefore, the flag will be "1" indicative of the previous reproducing data, which have already been read out, during a second reading despite that the current reproducing data are to be read out during the second reading. Once this occurs, all of the data read out during the second reading will be in error and the second error correcting decoder and/or the revising circuit will operate erroneously to such an extent that a favorable slow-motion picture can no longer be reproduced.

In order to avoid the foregoing problem, and according to the specification referred to above, use has been made of a second flag memory disposed in a rear stage with respect to the first flag memory so that a flag outputted from the first flag memory can be written into the second flag memory simultaneously with the first reading, and also of a switching circuit for switching over between two flags, which are an output from the first memory flag and an output from the second flag memory, so that the output of the first flag memory can be selected at the time of the first reading, but the output of the second flag memory can be selected at the time of the second or subsequent reading. With this arrangement, the data read out during the second or subsequent reading can be prevented from being processed as the previous reproducing data and, by inputting an output of the switching circuit to the second error correcting decoder, a reading side (the second error correcting decoder) can read out a written flag ("0") at all times. Thus, since neither the second error correcting decoder nor the revising circuit will operate erroneously, a favorable slow-motion picture can be reproduced. The foregoing is a summary of what has been disclosed in the specification referred to above.

According to the specification referred to above, use has been made of the first flag memory and the second flag memory to accomplish the slow-motion reproduction. However, in the present invention, a method is suggested to accomplish a reproduction of favorable slow-motion pictures, similar to those obtained during normal reproduction, without utilizing the second flag memory.

DISCLOSURE OF THE INVENTION

The present invention is intended to provide a reproducing apparatus capable of providing a picture quality similar to that obtained during normal reproduction, even during a frozen reproduction or a slow-motion reproduction.

In order to accomplish the above described object, a reproducing apparatus according to the present invention is provided with means for effecting an initialization of a flag memory during a reading at a timing at which the last field immediately preceding a writing is read out, in the case where the same and identical video data are repeatedly read out from a field memory such as occuring during the slow-motion reproduction or the frozen reproduction.

BEST MODE FOR CARRYING OUT THE INVENTION

Hereinafter, one embodiment of the present invention will be described with reference to the accompanying drawings.

Figure 1:
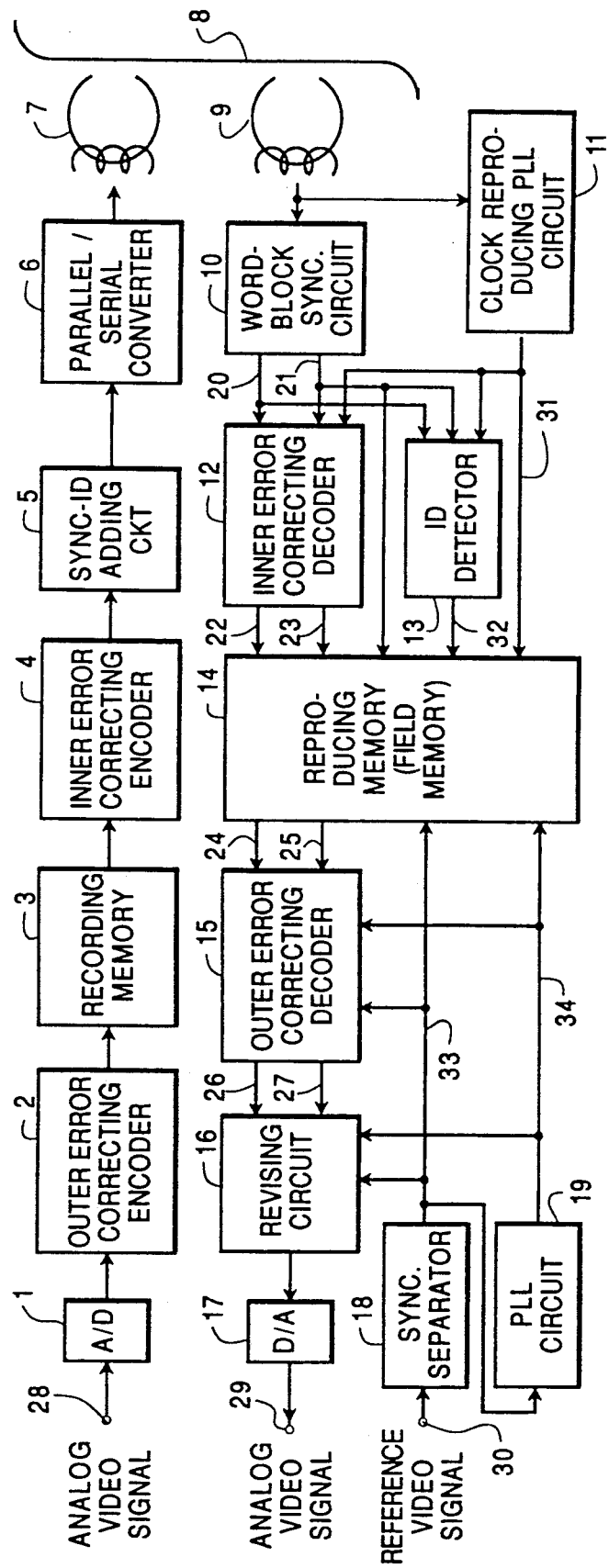
FIG. 1 is a block circuit diagram of a reproducing apparatus according to one embodiment of the present invention.

FIG. 1 illustrates a block circuit diagram showing a reproducing apparatus according to the embodiment of the present invention.

An upper half of FIG. 1 illustrates a recording system while a lower half of FIG. 1 illustrates a reproducing system. Reference numeral 1 represents an A/D converter for converting an analog video signal, inputted through a terminal 28, into a digital video signal. Reference numeral 2 represents an encoder on an outer side of a product code, which is an outer error correcting encoder. Reference numeral 3 represents a recording memory for the product code. Reference numeral 4 represents an encoder on an inner side of the product code, which is an inner error correcting encoder. Reference numeral 5 represents a sync.ID adding circuit for adding, for each inner encoded block, a sync for an inner block synchronization and a word synchronization and an address (ID . . . IDentifire . . . meaning an identifier) necessary to identify the position of a data in a picture during the reproduction. Reference numeral 6 represents a parallel/serial converter for converting into serial signals the data indicative of the number of bits for each word and both of the sync and the ID. Reference numeral 7 represents a recording head. Reference numeral 8 represents a recording medium. Reference numeral 9 represents a reproducing head. Reference numeral 10 represents a word.block synchronizing circuit for synchronizing a word with a block on the basis of the sync from a serial data reproduced by the reproducing head 9 and then converting the serial data into parallel data. Reference numeral 11 represents a clock reproducing PLL circuit for reproducing a clock in reference to the reproduced serial data. Reference numeral 12 represents an inner error correcting decoder. Reference numeral 13 represents an ID detector for subtracting an ID signal from the converted parallel data. Reference numeral 14 represents a reproducing memory (hereinafter referred to as a field memory) for the product code and a special effect reproduction. Reference numeral 15 represents an outer error correcting decoder. Reference numeral 16 represents a revising circuit for compensating for an error uncorrectable data on the basis of prediction from a nearby picture element. Reference numeral 17 represents a D/A converter for converting a digital video signal, revised by the revising circuit 16, into an analog video signal. To a terminal 30 is applied a reference video signal necessary to determine the timing of an output video signal during the reproduction. Reference numeral 18 represents a sync separator circuit for separating a sync signal from the reference video signal and for generating a timing signal required by the reproducing system circuits. Reference numeral 19 represents a PLL circuit for formulating, on the basis of the reference video signal, clocks to be utilized in the field memory 14 and subsequent stages. From a terminal 29 is outputted a converted and reproduced analog video signal.

The operation of the reproducing apparatus of the construction described above will now be described.

Figure 2:
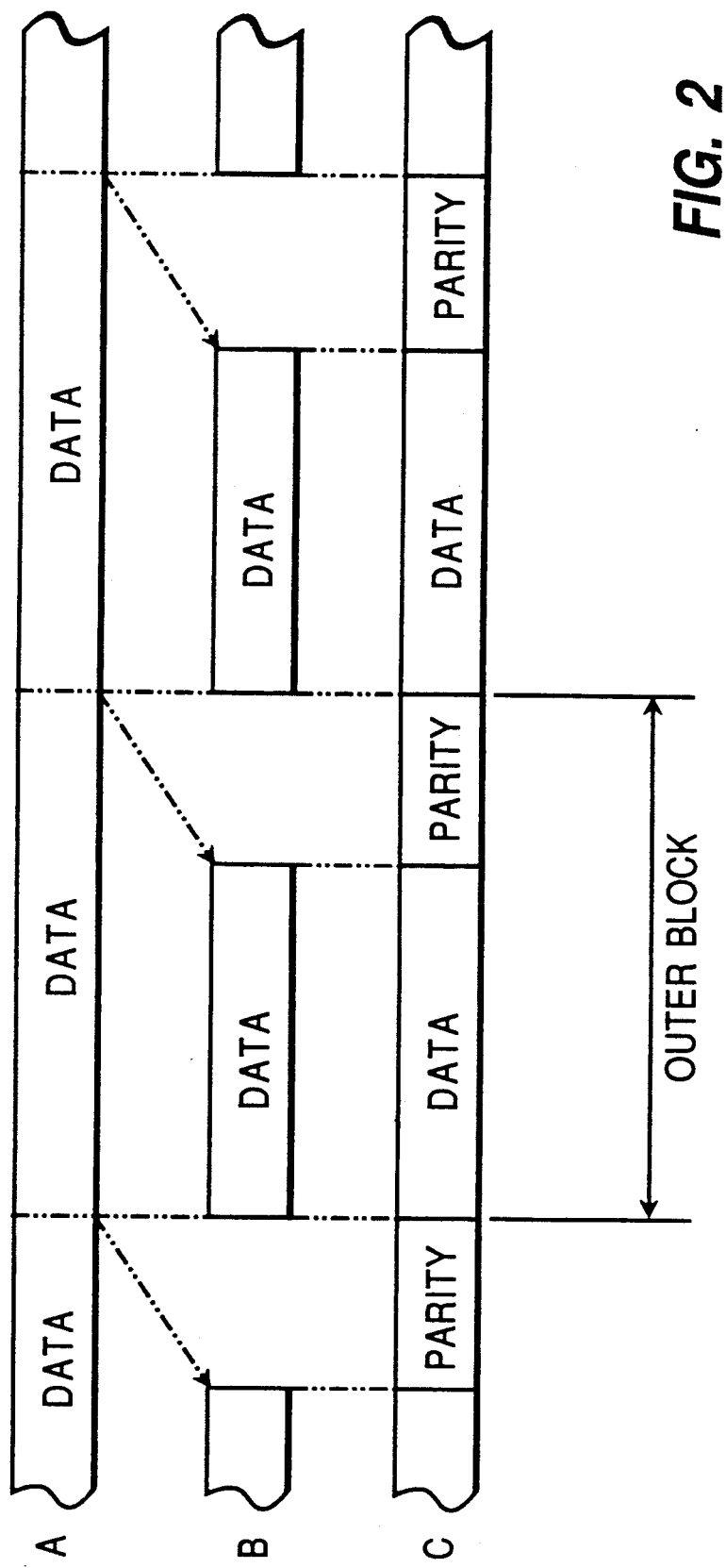
FIG. 2(A-C) is a diagram showing a timing of outer error correcting decoding, wherein A represents a video data which has been subjected to an A/D conversion; B represents an input to an outer error correcting encoder; and C represents an output from the outer error correcting encoder.

The analog video signal appearing at the terminal 28 is inputted to the A/D converter 1 for the conversion thereof into a digital video signal (hereinafter referred to as video data or, simply, data) which is subsequently inputted to the outer error correcting encoder 2. In the outer error correcting encoder 2, the data is divided into blocks each having such a size as shown in FIG. 2A, the data rate is compressed for each B block to provide a space as shown in FIG. 2B, and an error correcting encoding is carried out to this data so that a parity is added for each block (FIG. 2C, hereinafter this data is referred to as an outer block) to be outputted to the recording memory.

Figure 3:
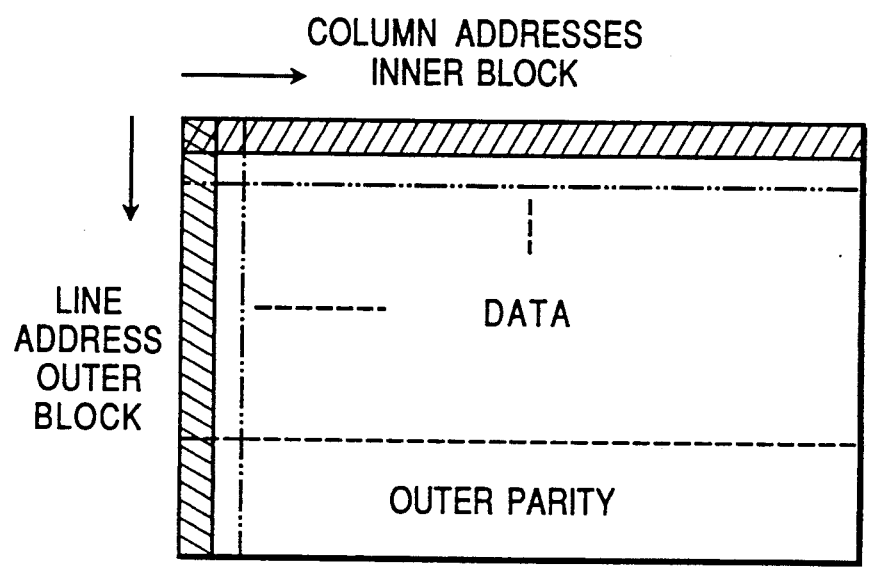
FIG. 3 is a diagram showing an arrangement of addresses of a memory.

In the recording memory 3 as shown in FIG. 3, for interleaving the product code, the address is divided into line addresses and column addresses, the line addresses being allocated to the outer block while the column addresses are allocated to an inner block as will be described later. The data outputted from the outer error correcting encoder 2 is written in line and column addresses of the recording memory 3 whose line address has been incremented for each word and whose column address has been incremented for each outer block. When the recording memory 3 becomes full, a reading takes place. The reading is carried out in such a manner as to increment the addresses in a column direction, to increment the line address when the column addresses become maximum and at the same to clear the column addresses and then to output to the inner error correcting encoder 4 after having been read out in the same manner.

The inner error correcting encoder 4 performs an error correcting encoding subject to an arrangement of data for each column (hereinafter referred to as an inner block) which is continued in the column direction and adds a parity of some words for each inner block. The inner error correcting encoded data is inputted to the sync.ID adding circuit 5.

Figure 4:
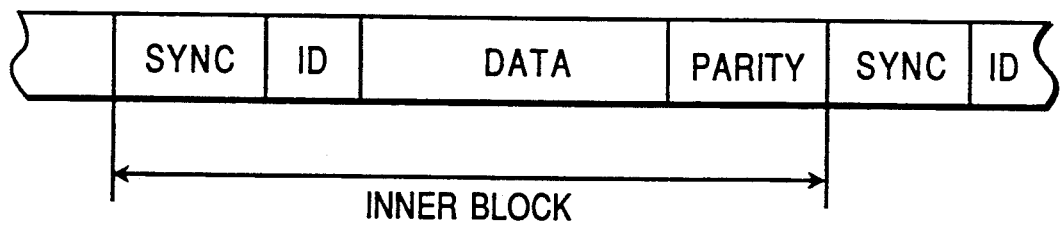
FIG. 4 is a diagram showing a signal format of an inner block.

In the sync.ID adding circuit 5, for the word synchronization and the block synchronization during the reproduction, a word having a predetermined bit pattern which is called a sync for each inner block is added. Along therewith, an ID indicative of the address of each inner block is added. In the case of the product code, it is necessary for the reproducing system to maintain the same interleave as that in the recording system. In order for the reproducing system to maintain the same interleave of the product code as that in the recording system, it can readily be accomplished if the address of the data to be written in the field memory 14 is rendered to be the same as that in the recording memory 3. For this purpose, the line address is added to each inner block so that the position of the particular inner block can be identified in the reproducing system. This address for each inner block is generally referred to as ID. Even this ID is added by the sync.ID adding circuit 5. The data to which both of the sync and the ID have been added (FIG. 4) is inputted to the parallel/serial converter 6 to provide a column of serial bits which are subsequently recorded on the recording medium 8 by the recording head 7.

The serial data reproduced by the reproducing head 9 tracing the data recorded on the recording medium 8 is supplied to both of the word.block synchronizing circuit 10 and the clock reproducing PLL circuit 11. The clock reproducing PLL circuit 11 is a PLL circuit for formulating the clocks (hereinafter referred to as an inner block) synchronized with bits of the serial data reproduced by the reproducing head 9. This inner clock is supplied to various reproducing system circuits from the word.block synchronizing circuit 10 to the field memory 14 and is utilized therein.

The word.block synchronizing circuit 10 detects a bit pattern of the sync from the reproduced serial data and converts the serial data into the parallel data at such timing. At the same time, the circuit 10 formulates and then outputs a timing signal 21 within the inner block. Both of the data 20 representing a word data of some bits as a result of the conversion into the parallel data and the timing signal 21 are supplied to each of the inner error correcting decoder 12, the ID detector 13 and the field memory 14. Where the word.block synchronizing circuit 10 has failed to detect the sync, no timing signal is outputted from the circuit 10. Accordingly, during the period of the inner block in which no sync is detected, the circuits utilizing the timing signal do not operate and, therefore, the data of the inner block will not be written in the field memory 14.

The inner error correcting decoder 12 performs an error correcting encoding of the data 20 for each inner block and then outputs an error-corrected or error-detected data 22 and a flag 23 to the field memory 14. Where the data 20 contains an error, this error if correctable is corrected. If it is not correctable, only the error detection is carried out and the data 22 will be the same as the data 20. Once the error has been detected, the flag 23 is rendered to be in a high level state, but where there is an error or where the error could have been corrected, the flag 23 is rendered to be in a low level state.

The ID detector 13 extracts the ID from the data 20 on the basis of the timing signal 21 and outputs it to the field memory 14.

The synchro separator circuit 18 separates the synchronism of the reference video signal inputted to the terminal 30 and outputs timing signals, required by circuits following the field memory 14, so that the phase of the reproduced output video signal (the reproduced video data) can match with the phase of the reference video signal.

The PLL circuit 19 is a PLL circuit for forming, from the synchro signal of the reference video signal, clocks for the D/A converter 17 and the reproducing system circuits including the field memory 14 and the following stages.

The field memory 14 has line and row addresses in a manner similar to those in the recording memory 3. Based on an output from the ID detector 13, as is the case with a reading side of the recording memory 3, the column address is incremented for each word and the line address is incremented for each inner block so that the data 22 and the flag 23 can be written. Also, from the field memory 14, the line address is first incremented, followed by an increment of the column address for each outer block so that the data and the flag can be read out. Both of the flag 24 and the data 25 so read out are inputted to the outer error correcting decoder 15.

The outer error correcting decoder 15 performs an error correcting decoding, for each outer block, of the data 24 read out from the field memory 14. At this time, the flag 25 is referred to during the error correcting decoding (lost error correction) to thereby increase a correcting capability. Also, as is the case with the inner error decoder 12, an outer error correcting decoding of the data 24 for each outer block is carried out so that the error-corrected or error-detected data 26 and the flag 27 can be outputted to the revising circuit 16. In the presence of an error in the data 24, this error if correctable is corrected. Should it be not correctable, only the error detection is carried out and the data 26 remains the same as the data 24. When the error is detected, the flag 27 is rendered to be in a high level state, but when there is no error or when the error is corrected, the flag 27 is rendered to be in a low level state.

The revising circuit 16 is adapted to receive both of the data 26 and 27 for the error correction and then provides an output to the D/A converter 17. In other words, if the flag 27 is in the high level state (where the data 26 contains the error), the value of such data is predicted from the value of a nearby picture element and is then outputted, but if the flag 27 is in the low level state, the value of the data 26 is outputted without being altered.

The D/A converter 17 is operable to convert the digital video signal supplied from the revising circuit 16 into an analog video signal which is subsequently outputted to the terminal 29.

Hereinafter, the details of the embodiment of the present invention will further be described with reference to FIGS. 5 to 7.

Figure 5:
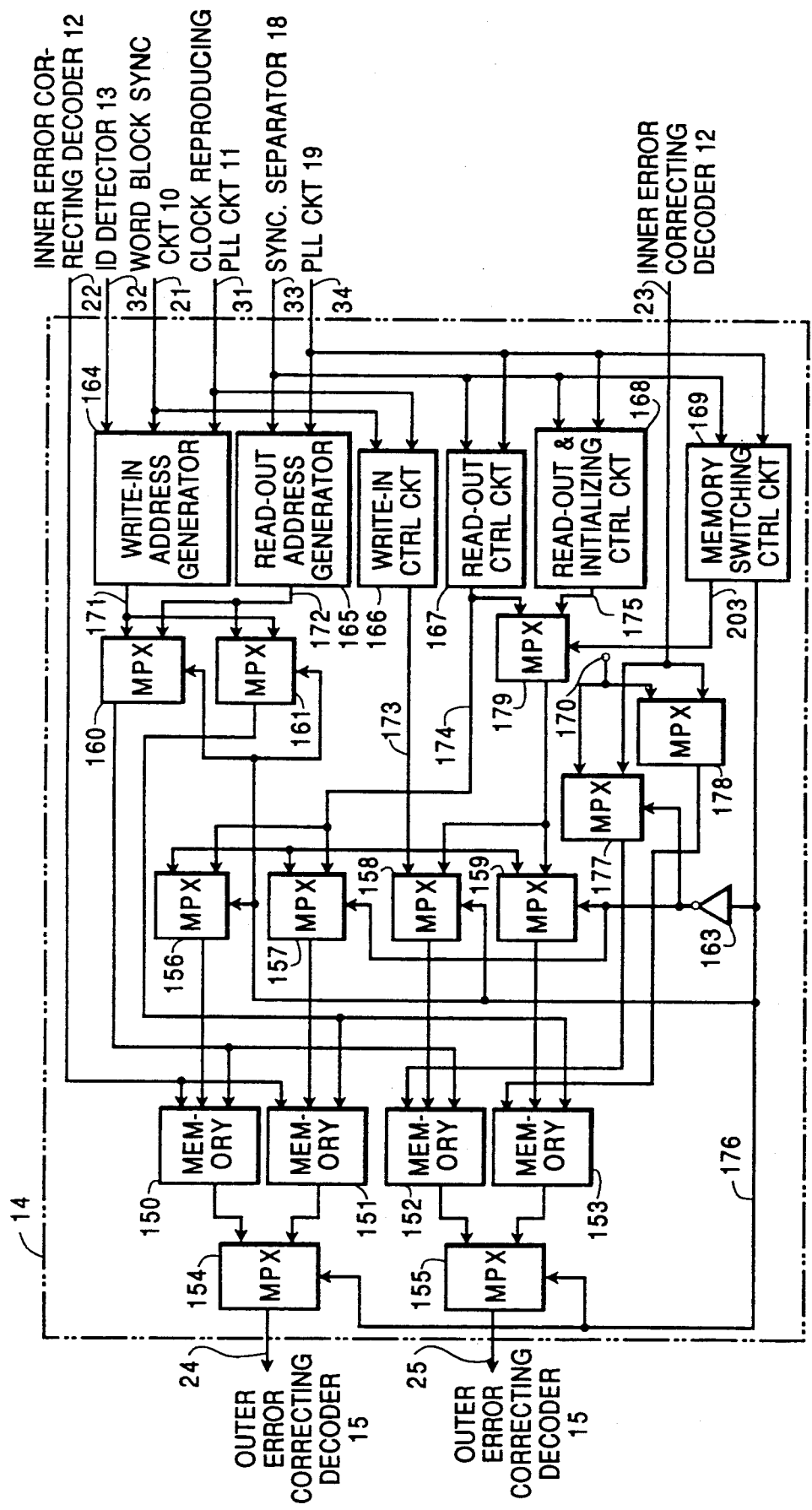
FIG. 5 is a block circuit diagram showing a reproducing memory (field memory) used in the reproducing apparatus according to the embodiment of the present invention.

FIG. 5 illustrates a block circuit diagram of the field memory; FIG. 6 illustrates a block circuit diagram of a memory switching control circuit; and FIG. 7 illustrates a diagram showing the timing of the memory switching control circuit.

Referring now to FIG. 5, reference numeral 21 represents a timing signal (hereinafter referred to as an inner timing signal) within the inner block outputted from the word.block synchronizing circuit 10 shown in FIG. 1. Reference numeral 22 represents a data whose error has been corrected by the inner error correcting decoder 12. Reference numeral 23 represents a flag outputted from the inner error correcting decoder 12. Reference numeral 24 represents a data outputted from the field memory 14. Reference numeral 25 represents a flag outputted from the field memory 14. Reference numeral 31 represents an inner clock reproduced by the clock reproducing PLL circuit 11. Reference numeral 32 represents an ID extracted from the data by the ID detector 13. Reference numeral 33 represents a timing signal (hereinafter referred to as an outer timing signal) on an outer side outputted from the synchro separator circuit 18. Reference numeral 34 represents a sample clock outputted from the PLL circuit 19. Reference numerals 150 and 151 represent data memories each having a capacity corresponding to one field of the video data. Reference numerals 152 and 153 represent flag memories each having a capacity corresponding to one field of the video data. Reference numeral 154 represents a multiplexer (hereinafter referred to as MPX) for selecting one of the data memories 150 and 151 for outputting. Reference numeral 155 represents an MPX for selecting one of the flag memories 152 and 153 for outputting. Reference numeral 164 represents a write-in address generator for generating a write-in address 171 for writing in the memories 150 to 153 from ID 32, the inner timing signal 21 and the inner clock 31. Reference numeral 165 represents a read-out address generator for generating a read-out address 172 from the outer timing signal 33 and the sample clock 34. Reference numeral 166 represents a write-in control circuit which forms and outputs, when its output is connected with control lines of the memories 150 to 153, a timing signal on the basis of the inner timing signal 21 and the inner clock 31 (hereinafter referred to as a read-out control signal) so that the memories 150 to 153 can be brought into a write-in mode. Reference numeral 167 represents a read-out control circuit which forms and outputs, when its output is connected with the control lines of the memories 150 to 153, a timing signal on the basis of the outer timing signal 33 and the sample clock 34 (hereinafter referred to as a read-out control signal) so that the memories 150 to 153 can be brought into a read-out mode. Reference numeral 168 represents a read-out and initializing circuit which forms and outputs, when its output is connected with the control lines of the memories 152 and 153, a timing signal on the basis of the outer timing signal 33 and the sample clock 34 (hereinafter referred to as a read-out and initialization control signal) so that the memories 152 and 153 can be brought into a read-out mode during the first half of the sample clock 34 and into a write-in mode during the later half of the sample clock 34. Reference numeral 169 represents a memory switching control circuit which forms, on the basis of the outer timing signal 33 and the sample clock 34, and then outputs, a signal 176 (hereinafter referred to as a memory switching signal) for switching the MPXs to determine whether the memories 150 and 152 are to be brought into the write-in mode and the memories 151 and 153 are to be brought into the read-out mode, or whether the memories 150 and 152 are to be brought into the read-out mode and the memories 151 and 153 are to be brought into the write-in mode. Reference numeral 156 represents an MPX for selecting and outputting one of the write-in control signal 173 and the read-out control signal 174 to the memory 150. Reference numeral 157 represents an MPX for selecting and outputting one of the write-in control signal 173 and the read-out control signal 174 to the memory 151. Reference numeral 158 represents an MPX for selecting and outputting one of the write-in control signal 174, the read-out control signal 174 selected by the MPX 179 and the read-out and initialization control signal 175 to the memory 152. Reference numeral 159 represents an MPX for selecting and outputting one of the write-in control signal 173, the read-out control signal 174 selected by the MPX 179 and the read-out and initialization control signal 175 to the memory 153. Reference numeral 160 represents an MPX for selecting and outputting one of the write-in address 171 and the read-out address 172 to the memories 150 and 152. Reference numeral 161 represents an MPX for selecting and outputting one of the write-in address 171 and the read-out address 172 to the memories 151 and 153. A terminal 170 is set to be in a high level state. Reference numeral 177 represents an MPX for selecting and outputting one of the flag 23 and the value (high level) at the terminal 170 to the memory 153. Reference numeral 163 represents an inverter for inverting the memory switching signal 176. Reference numeral 179 represents an MPX for selecting and outputting one of the read-out control signal 174 and the read-out and initialization control signal 175 to both of the MPXs 158 and 159.

The memory switching control circuit 169 will now be described with reference to FIGS. 6 and 7.

Figure 6:
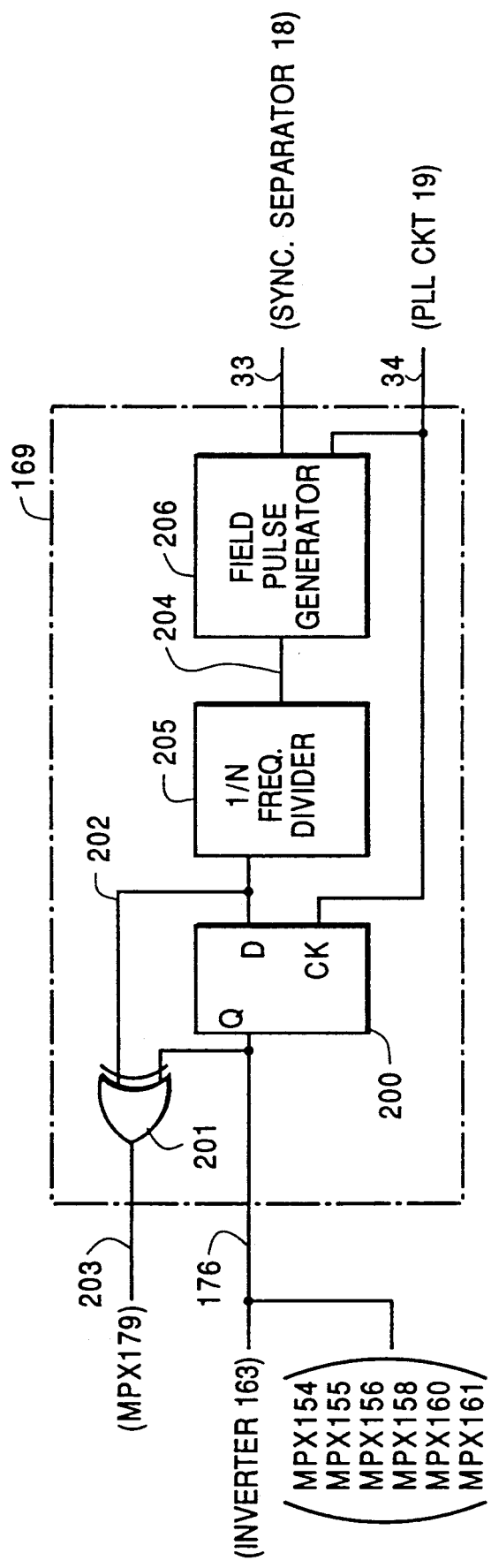
FIG. 6 is a circuit block diagram showing a memory switching control circuit used in the reproducing apparatus.
Figure 7:
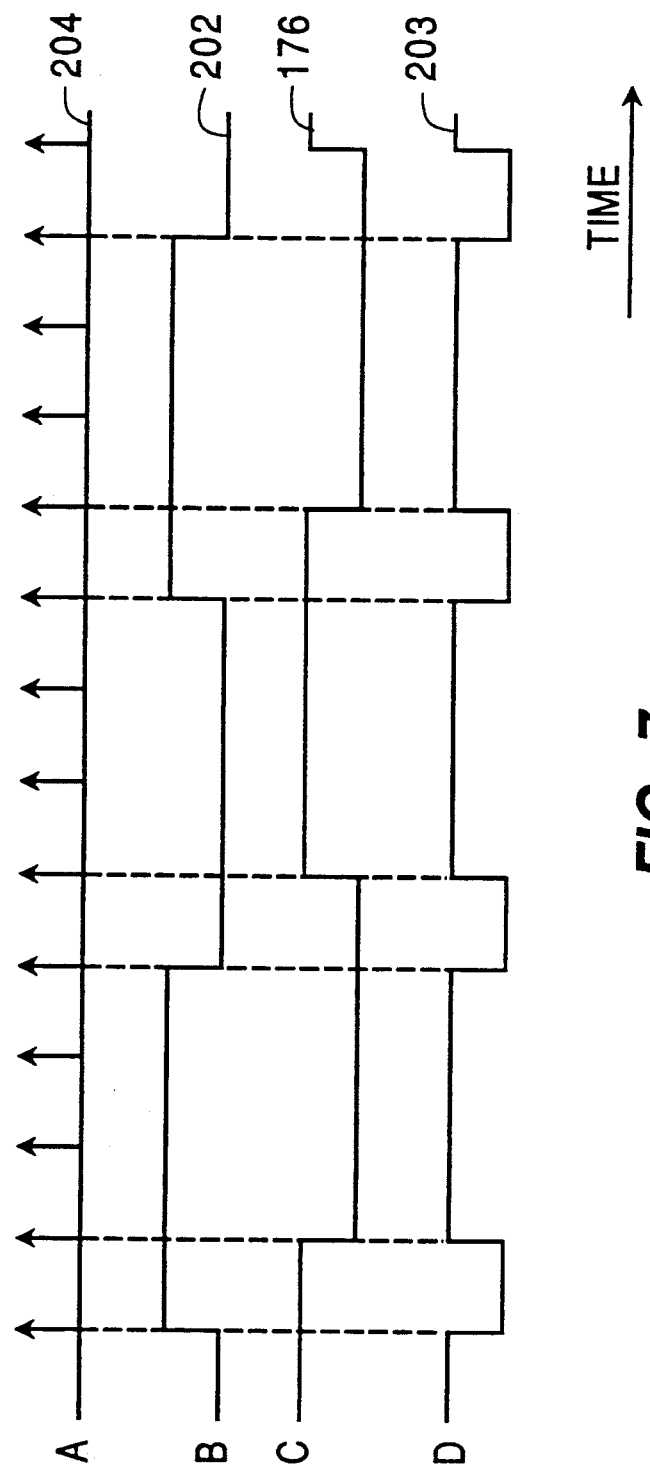
FIG. 7(A-D) is a diagram showing timings of the memory switching control circuit.

In FIG. 6, reference numeral 206 represents a field pulse generator for outputting a pulse for each field on the basis of the outer timing signal 33 and the sample clock 34. Reference numeral 205 represents a 1/N frequency divider for dividing the frequency of an output from the field pulse generator 206 by N. N is of a value determinative of the number of continued reading from any one of the memories and corresponding to a reproduction speed (by way of example, N=2 when at equal speed, N=4 when ½ slowed down, N=6 when ⅓ slowed down and so on). Reference numeral 200 represents a D-type flipflop. Reference numeral 201 represents an exclusive AND gate. The field pulse 204 (FIG. 7A) outputted from the field pulse generator 206 is inputted to the 1/N frequency divider 205 which subsequently outputs a rectangular wave 202 (FIG. 7B (when N=4)) having equal duration of high and low level states. Also, the rectangular wave 202 is inputted to the D-type flipflop 200 to form a rectangular wave 176 (FIG. 7C) having one field delay. This rectangular wave 176 is then inputted to the exclusive AND gate 201 which subsequently outputs a flag initialization permitting signal 203 shown in FIG. 7D.

The operation of the field memory so constructed as hereinabove described will be hereinafter described.

When the memory switching signal 176 is in the high level state, the MPX 154 selects an output from the memory 151. Accordingly, an output data 24 from the field memory 14 represents an output from the memory 151. Similarly, the MPX 155 selects an output from the memory 153 and the output flag 25 of the field memory 14 will be an output from the memory 153. The MPX 156 selects the write-in control signal 173. The MPX 157 selects the read-out control signal 174. The MPX 158 selects the write-in control signal 173. The MPX 159 selects one of the read-out control signal 174, which is selected by the MPX 179, or the read-out and initialization control signal 175. The MPX 160 selects the write-in address 171. The MPX 161 selects the read-out address 172. The MPX 161 selects the read-out address 172. The MPX 177 selects the flag 23. The MPX 178 selects the value (high level) at the terminal 170.

When the various MPXs so select as hereinabove described, the write-in address 171 and the write-in control signal 173 are inputted to the memory 150 and, therefore, the value of the data 22 is written in a location specified by the write-in address 172. The memory 151 is inputted with the read-out address 172 and the read-out control signal 174 and, therefore, the value at a location specified by the read-out address 172 is outputted from the memory 151 and will become a data 24 after having passed through the MPX 154. The memory 152 is inputted with the write-in address 171 and the write-in control signal 173 and, therefore, the value of the flag 23 is written at a location specified by the write-in address 171. The memory 153 is inputted with either both of the read-out address 172 and the read-out and initialization control signal 175 (when the flag initialization permitting signal 203 is in a low level state) or both of the read-out address 172 and the read-out control signal 174 (when the flag initialization permitting signal 203 is in a high level state) depending on the switching operation of the MPX 179 in response to the flag initialization permitting signal 203 to select one of the read-out control signal 174 and the read-out and initialization control signal 175.

Where both of the read-out address 172 and the read-out and initialization control signal 175 are inputted (the flag initialization permittting signal 203 is in the low level state), the value at the location specified by the read-out address 172 during the first half of the sample clock 34 is outputted from the memory 153 and will become a flag 25 after having passed through the MPX 155 and, on the other hand, the value (high level) at the terminal 170 is written at the location specified by the read-out address 172 during the later half of the sample clock 34. In other words, the reading is carried out during the first half of the sample clock 34 and, immediately after the reading, it is initialized to a high level state during the later half of the sample clock 34.

Where both of the read-out address 172 and the read-out control signal 174 are inputted (the flag initialization permitting signal 203 is in the high level state), the value at the location specified by the read-out address 172 is outputted from the memory 153 and will become the flag 25 after having passed through the MPX 155, and no flag is initialized. The flag initialization permitting signal 203 is in the low level state in response to one field immediately preceding the memory being switched over, and the initialization of the memory for the flag is carried out when this signal is in the low level state.

Summarizing the above, when the memory switching control signal 176 is in the high level state, the memories 150 and 152 write the data and the flag, respectively, and the data and the flag are read from the memories 151 and 153, respectively.

Conversely, when the memory switching control signal 176 is in the low level state, all of the MPXs except for the MPX 179 select the opposite signals. While the details thereof will not herein be set forth, the data and the flag are read out from the memories 150 and 152, respectively, and the memories 151 and 153 write the data and flag, respectively, when and so long as the memory switching control signal 176 is in the low level state. However, in either case, the flags read out from the memories 152 and 143 for the flags performs the initialization when the flag initialization permitting signal 203 is in the low level state, but does not perform the initialization when it is in the high level state.

In other words, when some fields are consecutively read out from the memories 152 and 153 for the flags such as during the slow-motion reproduction or the frozen reproduction, the initialization is carried out at the last field to be read. This is because, when the sync is not detected by the word.block synchronizing circuit 10 shown in FIG. 1, no inner timing signal 21 is outputted and, therefore, none of the data 22 and the flag 23 is written in the memory. Accordingly, if nothing is done, the data and the flag which have already been written remain stored in the memory. Accordingly, where no initialization of the flag is carried out, when the flag already written in is in the low level state (with no error occurring), the capability of the outer error correcting encoder 15 will be lowered even though no write-in takes place at the reading side, that is, as the incorrect data is deemed to be correct. In order to avoid this, the flags are all initialized to a high level state before the start of the writing operation. By so doing, when no sync is detected, the flag at the address of the memory at which nothing is written will be such that the high level state is read out without the capability of the outer error correcting encoder 15 being lowered.

As hereinbefore described, in the present embodiment, the provision has been made of the MPX 179 effective to switch over between the read-out control signal 174 and the read-out and initialization control signal so that the flag memory can be initialized at a timing one field preceding the switching of the memories to thereby permit the value of the flag, which has just been written into the flag memory, to be read out at any field.

It is to be noted that in the present embodiment the initialization of the flag has been described as carried out during a period subsequent to the reading at a certain address and prior to the subsequent reading. The present invention may not be limited thereto and similar effects can be attained even when the flag is initialized during a period subsequent to the reading of the last field following the completion of the reading of the field one position preceding the last field to be read when considering in units of fields, and prior to the switching onto the writing mode.

INDUSTRIAL APPLICABILITY

As hereinbefore fully described, even when some fields are repeatedly read out from the same memory such as during the slow-motion reproduction or the frozen reproduction, the value of the flag during the writing mode can be read out without being lost to avoid any possible reduction in capability of the error correction or revision and, therefore, a favorable reproduced picture quality can be secured.

We claim:

1. A method of reproducing recorded data which has been recorded on a recording medium, comprising the steps of:

detecting the recorded data from the recording medium;

generating a flag indicative of a state of the detected recorded data;

storing the detected recorded data into a data memory and the flag into a flag memory;

reading the detected recorded data from the data memory and the flag from the flag memory; and initializing the flag memory simultaneously with said reading of the flag from said flag memory during a reading period in which the detected recorded data and flag are to be repeatedly read from the data memory and flag memory a number of times prior to a subsequent writing of the detected recorded data and flag in the data memory and flag memory;

said initializing step being carried out only during a final time the detected recorded data stored in the data memory is read during the reading period prior to the subsequent writing of the detected recorded data into the data memory.

2. A method as recited in claim 1, further comprising the step of switching the flag memory between a first mode in which the flag memory is simultaneously initialized and read, and a second mode in which the flag memory is read only.

3. A method as recited in claim 2, further comprising the step of applying a signal to the flag memory during a later half of the reading period to switch the flag memory to the first mode.

4. A method as recited in claim 2, further comprising the step of switching the flag memory between a first case in which the flag read out during a first half of the reading period is written again at a same address during a later half of the reading period, and a second case in which predetermined constant value is read out and is written during the later half of the reading period.

5. A method as recited in claim 2, further comprising the steps of inverting and delaying by one field period a timing signal for switching between reading and writing of the flag memory and data memory, and switching the flag memory to the first mode according to an exclusive AND of the timing signal and the inverted and delayed timing signal.

6. A method as recited in claim 3, further comprising the steps of inverting and delaying by one field period a timing signal for switching between reading and writing of the flag memory and data memory, and switching the flag memory to the first mode according to an exclusive AND of the timing signal and the inverted and delayed timing signal.

7. A method as recited in claim 4, further comprising the steps of inverting and delaying by one field period a timing signal for switching between reading and writing of the flag memory and data memory, and switching the flag memory to the first mode according to an exclusive AND of the timing signal and the inverted and delayed timing signal.

8. An apparatus for reproducing data recorded on a recording medium, said apparatus comprising:

detecting means for detecting the data recorded on the recording means;

flag generating means for generating a flag indicative of a state of the data detected by said detecting means;

a flag memory for storing the flag generated by said flag generating means;

a data memory for storing the data detected by said detecting means;

read-out control means for reading the flag stored in said flag memory;

read-out and initialization control means for reading the flag stored in said flag memory and for initializing the flag memory; and, switching means for selectively activating one of said read-out control means and said read-out and initialization means;

said switching means activating said read-out and initialization means only during a final time the data stored in said data memory is read during a reading period in which the data and flag are to be repeatedly read from said data memory and flag memory a number of times prior to a subsequent writing of the data and flag in said data memory and flag memory.

* * * * *